United States Patent
Risch (10) Patent No.: US 12,521,313 B2
(45) Date of Patent: Jan. 13, 2026

(54) STORAGE CONTAINER FOR A STORAGE AND DISPENSING STATION

(71) Applicant: Becton Dickinson Rowa Germany GmbH, Kelberg (DE)

(72) Inventor: Thomas Risch, Sarmersbach (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 0 days.

(21) Appl. No.: 18/234,637

(22) Filed: Aug. 16, 2023

(65) Prior Publication Data

US 2023/0390162 A1     Dec. 7, 2023

Related U.S. Application Data

(63) Continuation of application No. 17/835,379, filed on Jun. 8, 2022, now Pat. No. 11,771,625, which is a
(Continued)

(30) Foreign Application Priority Data

Jun. 16, 2020 (EP) .................................... 20180292

(51) Int. Cl.
*A61J 7/00* (2006.01)
*B65G 1/08* (2006.01)

(52) U.S. Cl.
CPC .............. *A61J 7/0076* (2013.01); *B65G 1/08* (2013.01); *B65G 2201/027* (2013.01)

(58) Field of Classification Search
CPC ... A61J 7/0076; B65G 1/08; B65G 2201/027; B26D 3/30; B26D 7/18; B26D 7/0625; G07F 11/66
(Continued)

(56) References Cited

U.S. PATENT DOCUMENTS 2,219,958 A * 10/1940 Krause .................. A01C 19/00
                                                   74/606 R
2,886,209 A *  5/1959 Lermer .............. B65D 83/0409
                                                   222/452
(Continued)

FOREIGN PATENT DOCUMENTS

CN        110300996 A    10/2019
EP          2962956 A1    1/2016
(Continued)

OTHER PUBLICATIONS

Extended European Search Report for Application No. 20180291.5, dated Dec. 8, 2020, 13 pages including machine translation.
(Continued)

*Primary Examiner* — Rakesh Kumar
(74) *Attorney, Agent, or Firm* — MASCHOFF BRENNAN (57) ABSTRACT

A storage container for a storage and dispensing station for small piece goods, in particular drugs or dietary supplement products, is provided. The storage container includes a housing with an on the inside circular cylindrical section, a separating device arranged in the on the inside circular cylindrical section including a base body and multiple channels, the channels being open to the outer periphery of the separating device and each channel having a peripheral wall and two radial walls, and a retainer. At least one radial wall and/or the peripheral wall includes a depression and/or an elevation to reduce a contact area between a small piece good and the channel wall, the shape and size of the depression/elevation being selected in such a way that an electrostatic attraction between the small piece good and the channel wall is reduced. Methods of dispensing from a storage container are also provided.

20 Claims, 4 Drawing Sheets

Related U.S. Application Data continuation of application No. 16/920,071, filed on Jul. 2, 2020, now Pat. No. 11,382,834.

(58) Field of Classification Search
USPC .......................................................... 221/179
See application file for complete search history.

(56) References Cited

U.S. PATENT DOCUMENTS

| | | | | |
|---|---|---|---|---|
| 3,741,703 | A * | 6/1973 | Reynolds | B29B 9/00 |
| | | | | 425/222 |
| 3,906,809 | A * | 9/1975 | Erickson | F16H 9/24 |
| | | | | 474/83 |
| 4,588,366 | A * | 5/1986 | Glatt | B01J 2/16 |
| | | | | 264/117 |
| 4,946,359 | A * | 8/1990 | Christen | B01J 2/10 |
| | | | | 425/222 |
| 5,026,709 | A * | 6/1991 | Harwood | A61J 3/005 |
| | | | | 514/263.34 |
| 5,653,143 | A * | 8/1997 | Langevin | F16H 61/32 |
| | | | | 74/339 |
| 5,660,077 | A * | 8/1997 | Nekola | F16H 3/363 |
| | | | | 74/416 |
| 6,241,120 | B1 * | 6/2001 | Scholey | A61F 11/08 |
| | | | | 221/265 |
| 6,321,613 | B1 * | 11/2001 | Avidor | F16H 3/363 |
| | | | | 74/348 |
| 6,360,625 | B1 * | 3/2002 | Miyazaki | F16H 3/423 |
| | | | | 74/348 |
| 6,394,308 | B1 | 5/2002 | Yuyama et al. | |
| 6,513,679 | B2 * | 2/2003 | Greenwald | G07F 17/0092 |
| | | | | 221/296 |
| 6,786,356 | B2 * | 9/2004 | Geiger | A47J 31/60 |
| | | | | 99/290 |
| 6,802,229 | B1 * | 10/2004 | Lambert | F16H 3/423 |
| | | | | 74/348 |
| 7,028,572 | B2 * | 4/2006 | Willmot | F16H 3/42 |
| | | | | 74/393 |
| 7,395,946 | B2 | 7/2008 | Yuyama et al. | |
| 7,857,162 | B2 * | 12/2010 | Minami | B65G 47/1457 |
| | | | | 221/168 |
| 8,651,336 | B2 | 2/2014 | Gadini | |
| 9,004,315 | B2 * | 4/2015 | Yuyama | B65B 59/005 |
| | | | | 221/277 |
| 9,233,789 | B2 * | 1/2016 | Koike | B65D 83/04 |
| 9,238,545 | B2 * | 1/2016 | Bae | G07F 11/44 |
| 9,501,890 | B2 * | 11/2016 | Rudek | G07F 17/0092 |
| 9,828,168 | B2 * | 11/2017 | Schmidt-Ellinger | B65D 25/14 |
| 10,232,961 | B2 | 3/2019 | Kim | |
| 10,679,455 | B2 * | 6/2020 | Yoshida | G07F 11/44 |
| 11,691,804 | B2 * | 7/2023 | Braun | B65D 83/0409 |
| | | | | 221/263 |
| 2002/0195459 | A1 | 12/2002 | Greenwald et al. | |
| 2008/0078777 | A1 * | 4/2008 | Cittadino | B65H 20/02 |
| | | | | 221/303 |
| 2011/0163112 | A1 | 7/2011 | Takahama | |
| 2011/0170655 | A1 | 7/2011 | Yuyama et al. | |
| 2014/0339252 | A1 | 11/2014 | Bae et al. | |
| 2014/0361032 | A1 | 12/2014 | Czarnek | |
| 2015/0027286 | A1 * | 1/2015 | Yuyama | A61J 7/02 |
| | | | | 83/105 |
| 2015/0179017 | A1 * | 6/2015 | Rudek | G07F 11/54 |
| | | | | 221/186 |
| 2015/0179018 | A1 * | 6/2015 | Rudek | G07F 11/54 |
| | | | | 221/186 |
| 2015/0197391 | A1 | 7/2015 | Yuyama et al. | |
| 2015/0217929 | A1 | 8/2015 | Morita | |
| 2015/0330491 | A1 * | 11/2015 | Matsumura | F16H 3/66 |
| | | | | 475/198 |
| 2016/0001956 | A1 | 1/2016 | Schmidt-Ellinger et al. | |
| 2016/0052601 | A1 * | 2/2016 | Boulton | B62M 9/06 |
| | | | | 180/230 |
| 2016/0371916 | A1 * | 12/2016 | Omura | G07F 17/0092 |
| 2017/0188759 | A1 * | 7/2017 | Borke | A47K 10/3618 |
| 2017/0231871 | A1 | 8/2017 | Aldasouqi | |
| 2018/0079540 | A1 | 3/2018 | Schmidt-Ellinger et al. | |
| 2018/0221246 | A1 | 8/2018 | Hellenbrand et al. | |
| 2019/0021955 | A1 | 1/2019 | Omura | |
| 2021/0007936 | A1 | 1/2021 | Koike et al. | |
| 2022/0296472 | A1 * | 9/2022 | Risch | B65B 5/103 |
| 2023/0253869 | A1 * | 8/2023 | Koyama | H02K 7/116 |
| | | | | 74/490.03 |

FOREIGN PATENT DOCUMENTS

| | | | | |
|---|---|---|---|---|
| EP | 3235737 | A4 * | 8/2018 | ................ A61J 3/07 |
| EP | 3389022 | A1 | 10/2018 | |
| EP | 4104809 | A1 * | 12/2022 | ........... A61J 7/0076 |
| JP | 2000128105 | A | 5/2000 | |
| JP | 2000203502 | A | 7/2000 | |
| JP | 2004073371 | A | 3/2004 | |
| JP | 2009113821 | A | 5/2009 | |
| JP | 2009196715 | A | 9/2009 | |
| JP | 2010063787 | A | 3/2010 | |
| JP | 2010131233 | A | 6/2010 | |
| WO | WO-2011108448 | A1 | 9/2011 | |
| WO | WO-2013034504 | A1 | 3/2013 | |
| WO | WO-2016003649 | A1 * | 1/2016 | ........... A61F 15/001 |
| WO | WO-2016003650 | A1 * | 1/2016 | ........... A61F 15/001 |
| WO | WO-2016099094 | A1 | 6/2016 | |

OTHER PUBLICATIONS

Extended European Search Report for Application No. 20180292.3, dated Dec. 15, 2020, 16 pages including machine translation.
European Office Action for Application No. 20180292.3, dated Sep. 21, 2023, 17 pages including machine translation.
Japanese Office Action for Application No. 2022-577239, dated Dec. 10, 2024, 8 pages including translation.
Japanese Office Action for Application No. 2022-577240, dated Nov. 12, 2024, 6 pages including translation.
Chinese Office Action for Application No. 202180041895.1, dated Apr. 7, 2025, 10 pages including translation.
Japanese Office Action for Application No. 2022-577240, dated Mar. 18, 2025, 6 pages including translation.

* cited by examiner

STORAGE CONTAINER FOR A STORAGE AND DISPENSING STATION

CROSS-REFERENCE TO RELATED APPLICATIONS

This application is a continuation of U.S. patent application Ser. No. 17/835,379, filed Jun. 8, 2022, issued as U.S. Pat. No. 11,771,625, on Oct. 3, 2023, which is a continuation of U.S. patent application Ser. No. 16/920,071, entitled "STORAGE CONTAINER FOR A STORAGE AND DISPENSING STATION," filed Jul. 2, 2020, issued as U.S. Pat. No. 11,382,834, on Jul. 12, 2022, which claims priority to European Patent Application No. 20180292.3, entitled "STORAGE CONTAINER FOR A STORAGE AND DISPENSING STATION," filed Jun. 16, 2020, which are herein incorporated by reference in their entireties.

BACKGROUND

The present disclosure relates to a storage container for a storage and dispensing station for small piece goods, in particular, drugs or dietary supplement products.

SUMMARY

One or more embodiments provide a method of dispensing small piece goods from a storage container, the method comprising rotating a separating device disposed in a housing of the storage container, the separating device comprising a plurality of channels, each channel comprising a peripheral wall comprising a planar surface and two radial walls each comprising a planar surface; situating a first channel containing a small piece good over a dispensing opening in a bottom surface of the housing; dropping, by gravitational force, the small piece good through the dispensing opening; and reducing, by a contact reducing member disposed on the planar surface of the peripheral wall of the first channel, a contact area between the small piece good and the peripheral wall of the first channel.

One or more embodiments provide a method of dispensing small piece goods from a storage container, the method comprising rotating a separating device disposed in a housing of the storage container, the separating device comprising a plurality of channels, each channel comprising a peripheral wall comprising a planar surface and two radial walls each comprising a planar surface; situating a first channel containing a small piece good over a dispensing opening in a bottom surface of the housing; dropping, by gravitational force, the small piece good through the dispensing opening; and reducing, by a contact reducing member disposed on the planar surface of a first radial wall of the first channel, a contact area between the small piece good and the first radial wall of the first channel.

The foregoing and other features, aspects and advantages of the disclosed embodiments will become more apparent from the following detailed description and accompanying drawings.

BRIEF DESCRIPTION OF THE DRAWINGS

One or more embodiments of the storage container according to the disclosure are described below with reference to the accompanying drawing, in which.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Modern blister packaging machines, as disclosed, for example, in WO 2013/034504 A1, comprise, depending on the level of expansion, several hundred storage and dispensing stations. A plurality of drug portions of a particular drug are stored in each of these, and individual drug portions may be dispensed on request. The drugs stored in the storage and dispensing stations are compiled with the blister packaging machine and blister-packed patient-specifically according to the medically prescribed administration times.

Corresponding storage and dispensing stations for dispensing one or more drug portions are activated to compile the drug portions. When a storage and dispensing station is activated, a separating device which is arranged in the storage container of the storage and dispensing station is used to separate a single drug portion and to transfer it to a guide device of the blister packaging machine via a dispensing opening in the storage container. With the aid of the guide device, a dispensed drug portion, optionally by interposing a collecting device, is fed to a packaging device which blisters individual or multiple drug portions in accordance with a medical prescription.

To separate the drug portions stored in a storage container of a storage and dispensing station, the separating device comprises a plurality of channels, which are usually arranged on the outer circumference of a base body of the separating device. The dimensions of the channels must be adapted to the drug portions to be separated in such a way that the drug portions can only be arranged one above the other, but not next to one another, in one channel. The channels may, for example, be dimensioned in such a way that only one drug portion may be accommodated in one channel.

To dispense a drug portion from a channel, a channel is moved over the dispensing opening in the bottom surface of the housing of the storage container, and the drug portion situated in the channel (at the lowest point) slides or falls due to gravitational force into the dispensing opening. In order to prevent additional drug portions stored in or above the channel from also being dispensed, i.e., an unknown number of drug portions from being dispensed, in the area above the dispensing opening a retaining section of a retainer or separator is guided or situated at least in or above the channel that is aligned with the dispensing opening. The retaining section is situated in or above the channel with respect to the height of the channel in such a way that only one drug portion may be situated under the retaining section. If the retaining section is guided into the channel to separate the lowermost drug portion from those situated above it, individual channel-separating projections have a slot which accommodates the retaining section. If the retaining section is situated or guided over the channels, it is guided routinely only slightly over the upper ends of the projections to avoid additional drug portions from entering the channel when the drug portion is dispensed.

As stated above, a drug portion is separated by rotating a channel over the dispensing opening. The drug portion (usually one) situated in the channel (or in the lower channel section) falls due to gravitational force out of the channel (channel section). In some cases, however, especially when light and/or drug portions having outer surfaces extensively abutting the channel wall are to be separated, the gravitational force is not sufficient to initiate a dispensing through the dispensing opening—the drug portion remains caught in the channel due to electrostatic attraction between the drug portion and the channel wall, the channel is rotated away over the dispensing opening during the assumed dispensing without the drug portion being dispensed. This results in incorrect drug compilations.

It is an object of the present disclosure to provide a storage container for a storage and dispensing station for small piece goods, in which incorrect drug dispensing resulting from a drug portion remaining caught in a channel of the separating device are avoided.

The storage container according to the disclosure for a storage and dispensing station for small piece goods comprises a housing enclosing a receiving space for small piece goods having an on the inside circular cylindrical section and a housing bottom surface having a dispensing opening, as well as a separating device situated in the inner cylindrical section of the housing with a base body and multiple channels for receiving at least one small piece good, the channels being open to the outer circumference of the separating device and being defined by webs formed between them on the base body, and each channel having a peripheral wall and two radial walls, and including a base area facing the housing bottom surface, the base area having dispensing openings of the channels. The storage container further comprises a retainer including a positioner and a retaining section, the positioner holding the retaining section above the dispensing opening.

According to the disclosure, a radial wall and/or the peripheral wall has a contact reducing member (e.g., depression and/or elevation) to reduce a contact area between small piece good and the channel wall, the shape and size of which is selected in such a way that an electrostatic attraction between small piece goods and the channel wall is reduced.

According to the disclosure, the term depressions and/or elevations is used, since in the case of a flat base area the one always determines the other. For example, if the depressions predominate, the elevations are the outstanding feature, and if the elevations predominate, the depressions are the outstanding feature. It is essential that the reduction in the contact area leads to a reduced electrostatic attraction in order to prevent the drug portions from being drawn in or adhering to the base area. The design of the depressions/elevations also depends on the shape of the drug portions to be separated. If, for example, flat circular drug portions are to be separated, depressions, for example, should not be selected such that the flat drug portion with the flat section fits more or less exactly into a depression. For the person skilled in the art, a choice of the appropriate depressions/elevations arises immediately from the exact shape and from further characteristics of the drug portions to be separated. It is also self-evident that the depressions/elevations should be selected so that their shape does not cause any damage to the drug portions when the latter move through a channel. Thus, protruding tips and sharp edges, in particular, should be avoided.

The reduction in the contact area reduces a potential electrostatic attraction between the channel wall and the drug portion, a catching in a channel does not occur, the drug portion falls through the dispensing opening due to gravitational force if the channel is appropriately aligned, and incorrect dispensing of drug portions is avoided.

In addition, it has been found that the depressions and/or elevations not only reduce the electrostatic interaction between the channel wall and the drug portion, but also the electrostatic charge of the drug portion itself is reduced. This has a positive effect with regard to the further travel of the drug portion through the blister packaging machine. When using conventional storage containers, it may happen due to the electrostatic charge of the drug portions that they are not caught in a channel, but in a component of the blister packaging machine, such as a guide device for guiding drug portions into a collecting device, situated downstream. This may also result in incorrect drug compilations. The reduced electrostatic charge of the drug portion also reduces the risk of adhesion in components located downstream, and the risk of an incorrect dispensing is further reduced.

In one or more easy to produce embodiments, it is provided that depressions are designed (at least partially) as horizontal grooves. Alternatively or additionally, it is provided in one or more embodiments that depressions are designed as vertical grooves.

Due to the fact that drug debris occurs during the separation, regular cleaning of the separating device is necessary. Cleaning is also necessary, regardless of contamination with drug debris, if another type of drug is to be separated with the storage container—as already stated above, it is necessary due to the need to adapt the channels to the form and shape of the drug portions, to adapt a separating device to the drug portions to be separated. In one or more embodiments, which is particularly easy to thoroughly clean, it is provided that the vertical grooves are designed open to the dispensing openings of the channels. The design, which is open at the bottom, also has the advantage that no drug debris accumulates in the depression or groove—this prevents a larger accumulation of drug debris from a groove being dispensed through the dispensing opening when a channel is aligned with the dispensing opening.

As stated above, the webs may have a slot, which divides the webs and the channels into lower and upper sections. The retaining section of the retainer is then guided in the slot. Whether a "two-part" or one-part design of the webs/channels is selected depends, in particular, on the geometry of the type of drug. The use of two-part (and therefore longer) channels is useful, in particular, in the case of non-spherically symmetrical drug portions, for example, in capsule form, since the longer channels provide more time for a drug portion to be separated to align itself in the channel, which in turn reduces the error rate during dispensing.

The upper channel sections open up to the receiving space for drug portions, thus, drug portions regularly press from above. However, when a receiving space for drug portions is almost empty, this pressure from additional drug portions is missing. The same applies to the lower channel sections when they are rotated over the dispensing opening—the retaining section separates the sections, pressing from above does not take place at the moment of dispensing, and a catching cannot be ruled out.

In order to prevent a catching or adhering in the lower and upper channel section in a separating device having divided webs or channels, even when the receiving space is almost empty, it is provided in one or more embodiments, in which the webs have a horizontal slot which divides the webs into an upper and a lower web section and the channels into upper and lower channel sections, that the depressions and/or elevations are arranged in at least one radial wall and/or one peripheral wall of the lower and upper channel section.

Figure 1A:
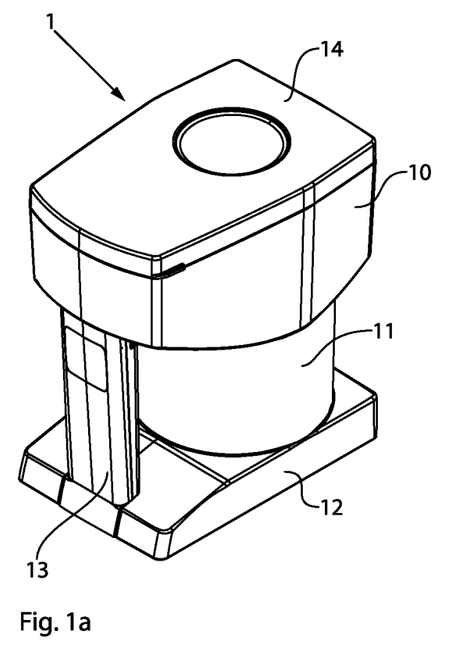
FIG. 1a is a perspective view of a storage container, according to aspects of the disclosure.
Figure 1B:
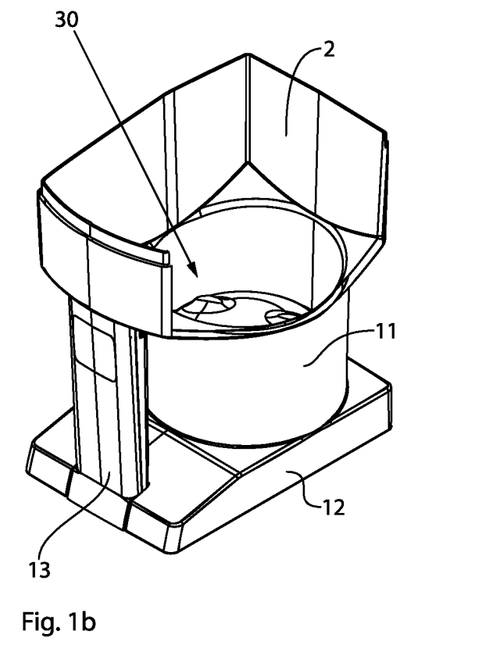
FIGS. 1b and 1c are perspective partially cut away views of the storage container of FIG. 1a, according to aspects of the disclosure.
Figure 1C:
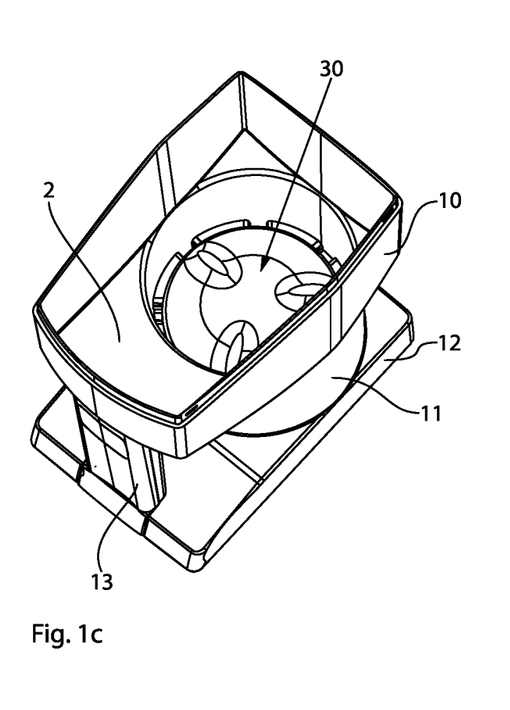

FIGS. 1a-1c show different perspective views of one or more embodiments of a storage container 1 according to the disclosure. The storage container 1 includes a housing 10 enclosing a receiving space 2 for drug portions, which has an inside circular cylindrical section 11 in the lower section. The storage container 1 further includes a base plate 12 and a cover 14, which is arranged on the housing 10 during operation of a storage and dispensing station (not shown) and may be removed for refilling. For better handling, the storage container 1 includes a handle 13 in the front area. As may be seen in particular in FIG. 1c, a separating device 30 having a base body 31 is situated in the on the inside circular cylindrical section 11.

Figure 2:
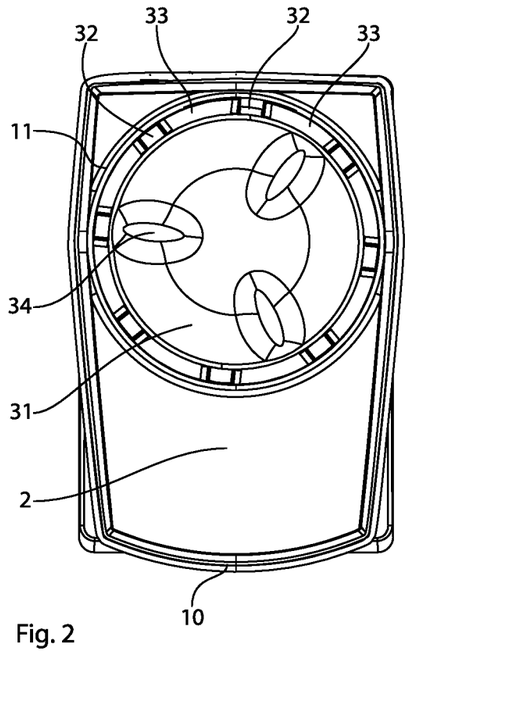
FIG. 2 is a top view of the storage container of FIG. 1c, according to aspects of the disclosure.

In FIG. 2 it may be seen that three projections 34 are arranged on the base body 31, which ensure a movement of drug portions within the receiving space 2 and thus facilitate a sliding of drug portions into channels 32. The channels 32 are open to the outer circumference of the separating device 30 and are defined by a plurality of webs 33 arranged on the base body 31 of the separating device 30. The webs 33 themselves may be attached, but they may also be formed by milling out the channels 32. As may be seen in the following figures, both the channels 32 and the webs 33 may be divided by a slot 35 into lower and upper sections.

Figure 3A:
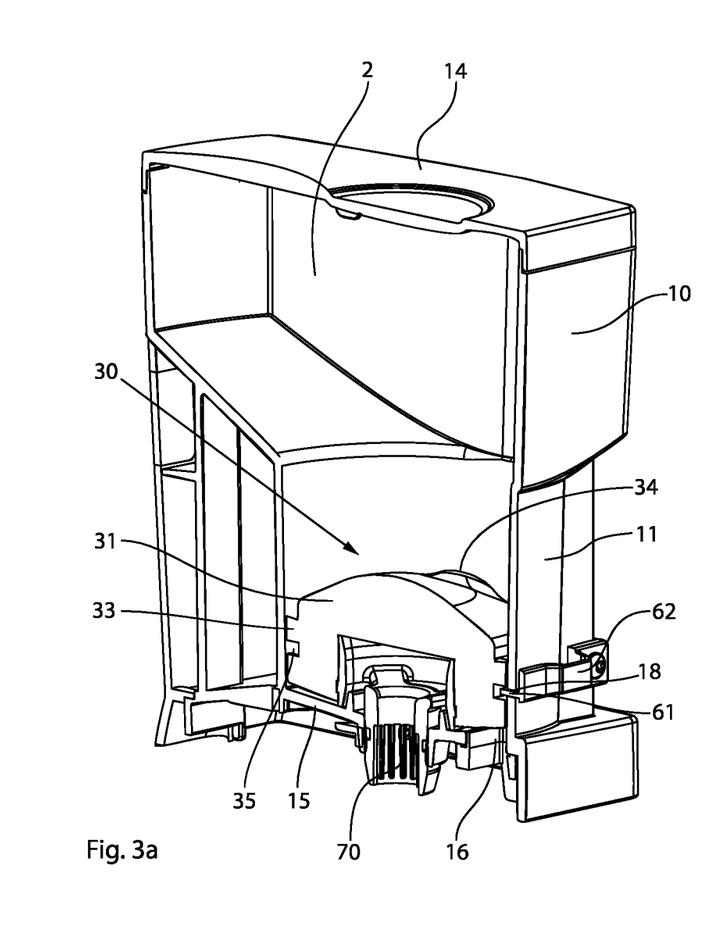
FIGS. 3a and 3b are perspective sectional views of the storage container of FIG. 1a, the interior of the separating device being illustrated in FIG. 3b, according to aspects of the disclosure.
Figure 3B:
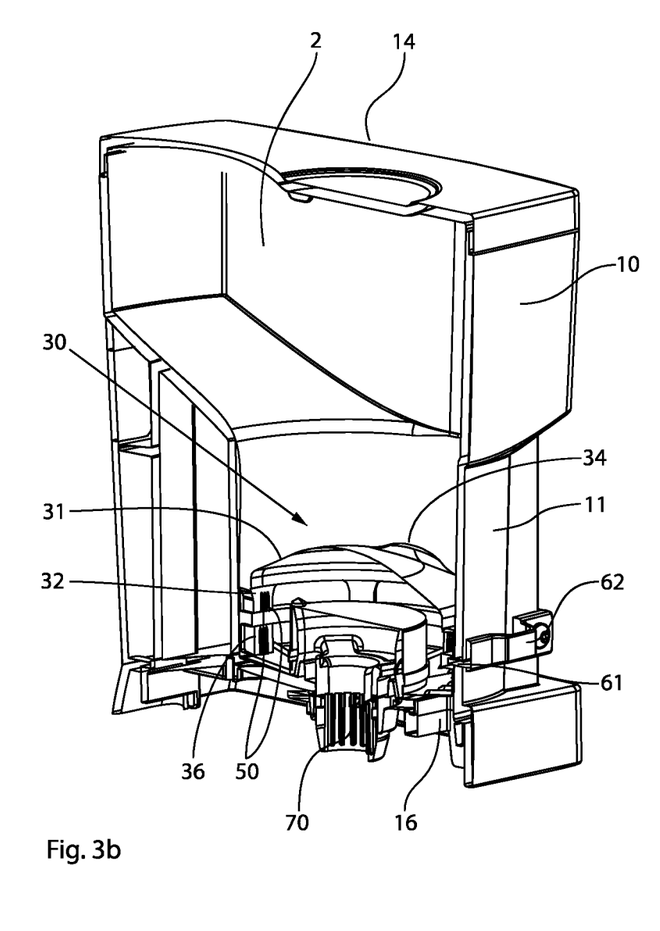

FIGS. 3a and 3b show sectional views of the storage container 1 according to the disclosure, the interior of the separating device 30 being recognizable in FIG. 3b. As may be seen in FIGS. 3a and 3b, the separating device 30 is held over a housing bottom surface 15 in the inside circular cylindrical section 11 via a coupler 70. As already indicated above, the webs 33 are divided by a slot 35 into lower and upper web sections 33a, 33b, which is described in greater detail in the subsequent figures.

In FIGS. 3a and 3b it is also indicated that a retaining section 61 of a retainer 60 is guided into the slot 35 via a slot 18 in the inside circular cylindrical section 11 of the housing and is consistently kept aligned in this slot 18 with the dispensing opening 16. This ensures that the retaining section 61 is consistently held over a dispensing opening of a channel 32, which is rotated over the dispensing opening 16. With the retaining section 61 in position, it is not possible for further drug portions to enter the lower channel section 32b, even if a drug portion is no longer present in the lower channel section 32b of the aligned channel 32. As a result of this alignment of the retaining section 61, only as many drug portions may pass from the lower channel section 32b of the aligned channel into the dispensing opening 16 as are situated in the lower channel section 32b. For example, the channels 32 may be adapted to the drug portions in such a way that only one drug portion is situated in each channel section 32a, 32b. The retaining section 61 of the retainer 60 is held via a positioner 62, which may be fastened to the outside of the housing 10.

In FIG. 3b, it was already indicated that three contact reducing members (e.g., depressions, grooves) 50 are vertically arranged on a peripheral wall 36 of a lower and upper channel section, which in the embodiment shown are open at the bottom in the lower channel section 32a, 32b, which simplifies cleaning and introduction of the contact reducing members 50. By introducing the contact reducing members 50, the contact area between a drug portion potentially situated in the channel section 32a, 32b and the peripheral wall 36 is reduced, which in turn reduces the electrostatic attraction between the peripheral wall 36 of the channel section 32a, 32b and a drug portion, thereby avoiding a catching in the channel section 32a, 32b if the channel section 32a, 32b is rotated over the dispensing opening 16. As already explained above, the electrostatic charge of the drug portion sliding through the channel 32 is also reduced, which also reduces the risk of getting caught in a component downstream.

As already explained above, different types of drugs are separated using the storage containers 1, and this makes it practical to adapt the manner of reducing the contact area between the drug portion and the peripheral wall 36 to the type of drug product. In one or more embodiments, as shown in FIG. 3b, three contact reducing members 50 are arranged in the peripheral wall 36 of the channel section 32a, 32b, i.e., the wide wall of the channel section 32a, 32b (see FIG. 2 in this regard). A corresponding configuration is useful, in particular, for round, flat drug portions, which may have a large potential contact area between the drug portion and the peripheral wall 36. For other forms of drug portions, such as elongated narrow shapes, it may be practical to choose other configurations.

Figure 4A:
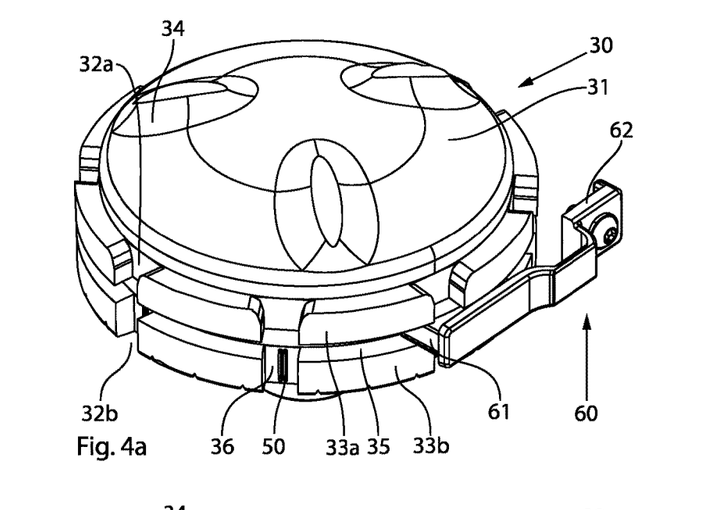
FIGS. 4a and 4b are perspective views of a combination separating device/retainer, according to aspects of the disclosure.
Figure 4B:
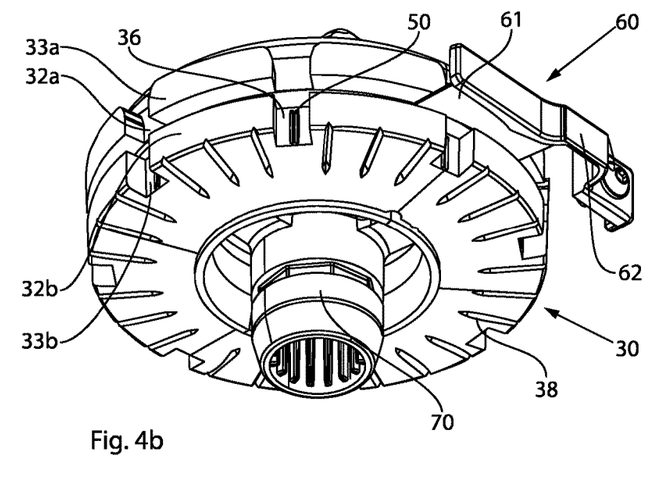

FIGS. 4a and 4b show a combination separating device 30/retainer 60 of one or more embodiments. In the figures it may be clearly seen that the channels 32 and the webs 33 are divided by a slot 35 into upper and lower channel sections 32a, 32b and upper and lower web sections 33a, 33b. The retaining section 61 of the retainer 60 is situated in the slot 35. As described in previous figures, the retaining section 61 is held over the dispensing opening 16 (not shown), so that drug portions in the channel 32 aligned with the dispensing opening 16 are prevented from falling from the upper channel section 32a into the lower channel section 32b. As shown in FIGS. 4a and 4b, two contact reducing members 50 are arranged in the peripheral wall 36 of the channel 32, in this case the lower channel section 32b.

In FIG. 4b it may also be seen that a plurality of horizontal radial grooves 38 are arranged on the bottom surface of the separating device 30 and are kept open towards the periphery of the separating device 30. These horizontal radial grooves 38 prevent a drug portion from adhering to the base area 39 (see FIG. 7). In this case too, the electrostatic attraction is reduced by the reduced contact area. A configuration having only two contact reducing members 50 may be selected, for example, if the drug portion to be separated is heavy, but there is still such a strong electrostatic attraction that the drug portions would not be dispensed due to gravitational force without the contact reducing members 50.

Figure 5:
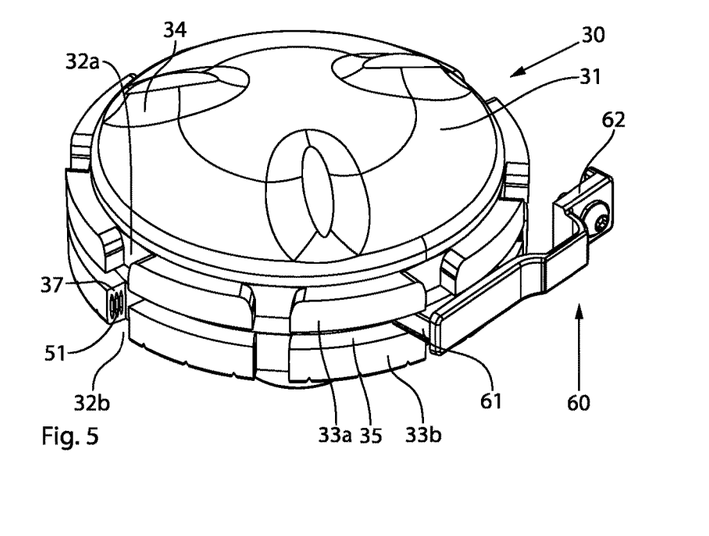
FIG. 5 is a perspective view of a combination separating device/retainer, according to aspects of the disclosure.

FIG. 5 shows one or more embodiments in which the contact reducing members are not arranged in the peripheral wall 36 of a channel section 32a, 32b. Here, three contact reducing members (e.g., depressions) 51 are arranged in a radial wall 37 of the lower channel section 32b to match the shape of the drug portion to be separated. Such a configuration makes sense if the contact area between the drug portion and the radial wall 37 is larger than that for the peripheral wall 36 of a channel section 32a, 32b.

Figure 6:
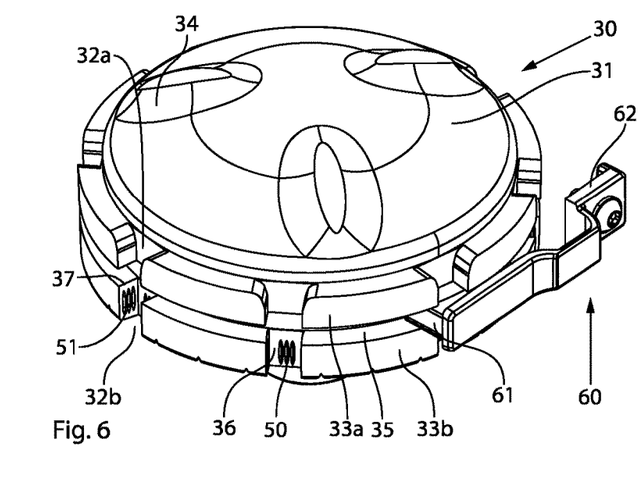
FIG. 6 is a perspective view of a combination separating device/retainer, according to aspects of the disclosure.

FIG. 6 shows one or more embodiments in which contact reducing members 50 are arranged in the peripheral wall 36 and contact reducing members 51 are arranged in a radial wall 37.

Contact reducing members 50, 51 may not be necessary in the upper channel sections 32a, since the overlying drug portions may provide sufficient pressure and thus ensure that they slide into a free channel section 32a if a drug portion is dispensed and the separating device 30 is rotated further. As described above, it may be seen that the contact reducing members 51 (e.g., depressions and/or elevations) may be adapted precisely to the drug portions to be separated. If only one or two contact reducing members 50, 51 are necessary, for example, their introduction may be more advantageous than is the case shown in FIG. 6. There is thus the possibility of "tailoring" the separating device 30.

FIG. 7 again shows an oblique view of the separating device 30 according to one or more embodiments. Here, the channel 32 is separated into upper and lower channel sections 32a, 32b with contact reducing members 50 being provided in both channel sections 32a, 32b. As may be clearly seen in this enlarged view, the contact reducing members 50 in the lower channel section 32b are open towards the base area 39 of the separating opening or the dispensing opening of the channel 32 or channel section 32b, i.e., they have outlet openings 52. A detailed view of this is shown in FIG. 8. These outlet openings 52 prevent drug debris from accumulating in the contact reducing members 50 because the drug debris is able to fall continuously out of the contact reducing members 50, thus preventing a large amount of drug debris from being released through the outlet openings 52. In addition, the outlet openings 52 simplify the cleaning and introduction of the contact reducing members 50.

Figure 7:
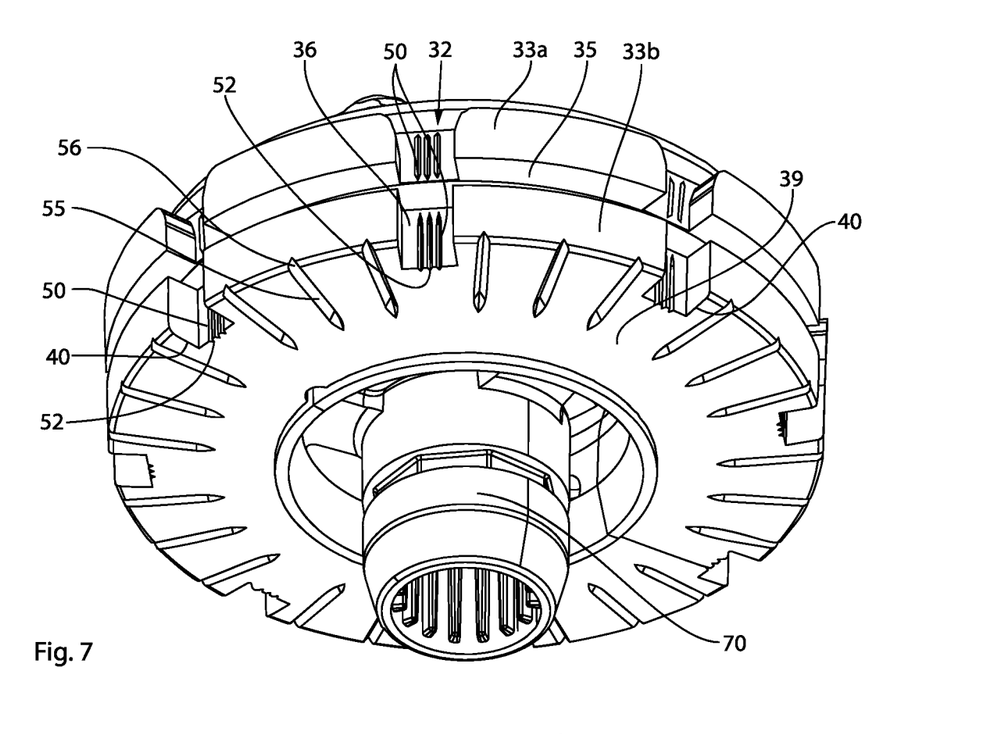
FIG. 7 is a perspective view of a combination separating device/retainer, according to aspects of the disclosure.
Figure 8:
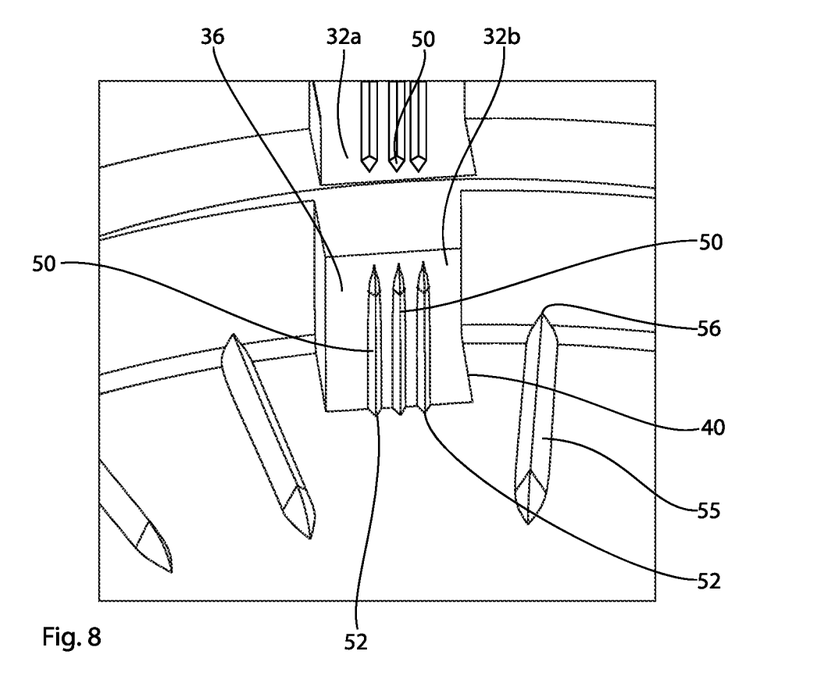
FIG. 8 is a detailed view of a section of the combination separating device/retainer of FIG. 7.

In FIG. 7, the radial grooves 55 in the base area 39 of the separating device 30 may also be clearly seen. These are also designed with an outlet opening 56, however, this outlet opening 56 opens to the periphery of the separating device 30. The function of these grooves 55 has already been described above. Finally, FIG. 7 shows the coupler 70, with which the separating device 30 may be coupled to a motor unit (not shown) of a storage and dispensing station (not shown). The storage and dispensing station may be releasably fastened to a blister packaging machine (not shown) via the motor unit.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed:

1. A method of dispensing small piece goods from a storage container, the method comprising:
   rotating a separating device disposed in a housing of the storage container, the separating device comprising a plurality of channels disposed around a perimeter of the separating device, each channel comprising an upper section and a lower section divided by a slot, each upper section and each lower section comprising only one peripheral wall comprising a planar surface, and only two radial walls each comprising a linearly smooth planar surface disposed at a perpendicular angle from the peripheral wall and an opening on an outer circumference of the separating device opposing the peripheral wall;
   situating a first channel containing a small piece good over a dispensing opening in a bottom surface of the housing;
   dropping, by gravitational force, the small piece good through the dispensing opening; and
   reducing, by only three contact reducing members disposed on the planar surface of the peripheral wall of the lower section of the first channel, a contact area between the small piece good and the peripheral wall of the lower section of the first channel, wherein the planar surface of the peripheral wall of the lower section of the first channel is linearly smooth other than where the three contact reducing members are disposed.

2. The method of claim 1, further comprising reducing an electrostatic attraction between the small piece good and the peripheral wall.

3. The method of claim 1, wherein each contact reducing member comprises a depression, the method comprising:
   reducing, via the depression, the contact area between the small piece good and the first channel.

4. The method of claim 1, wherein each contact reducing member comprises a vertical groove, the method comprising:
   reducing, via the vertical groove, the contact area between the small piece good and the first channel.

5. The method of claim 1, wherein each contact reducing member comprises an elevation, the method comprising:
   reducing, via the elevation, the contact area between the small piece good and the first channel.

6. The method of claim 1, wherein the plurality of channels is defined by a plurality of webs disposed on a base body of the separating device and comprising a horizontal slot dividing each of the plurality of webs into an upper web section and a lower web section, and dividing each of the plurality of channels into an upper channel section and a lower channel section, the method comprising:
   reducing, via the contact reducing members disposed on a peripheral wall of the lower channel section of the first channel, the contact area between the small piece good and the lower channel section of the first channel.

7. The method of claim 6, wherein a retaining section of a retainer is disposed in the horizontal slot, the method comprising:
   preventing, by the retaining section, another small piece good in the first channel aligned with the dispensing opening from falling from the upper channel section of the first channel into the lower channel section of the first channel.

8. The method of claim 1, wherein the plurality of channels is defined by a plurality of webs disposed on a base body of the separating device and comprising a horizontal slot dividing each of the plurality of webs into an upper web section and a lower web section, and dividing each of the plurality of channels into an upper channel section and a lower channel section, the method comprising:
   reducing, via the contact reducing members disposed on a peripheral wall of the upper channel section of the first channel, the contact area between the small piece good and the upper channel section of the first channel.

9. The method of claim 8, wherein a retaining section of a retainer is disposed in the horizontal slot, the method comprising:
   preventing, by the retaining section, another small piece good in the first channel aligned with the dispensing opening from falling from the upper channel section of the first channel into the lower channel section of the first channel.

10. The method of claim 1, wherein a plurality of horizontal radial grooves are arranged on a bottom surface of the separating device and are open towards an outer periphery of the separating device, the method comprising:

preventing, via the plurality of horizontal radial grooves, the small piece good from adhering to a base area on a bottom surface of the separating device.

11. A method of dispensing small piece goods from a storage container, the method comprising:

rotating a separating device disposed in a housing of the storage container, the separating device comprising a plurality of channels, each channel comprising an upper section and a lower section divided by a slot, each upper section and each lower section comprising only one peripheral wall comprising a planar surface, and only two radial walls each comprising a linearly smooth planar surface disposed at a perpendicular angle from the peripheral wall and an opening on an outer circumference of the separating device opposing the peripheral wall;

situating a first channel containing a small piece good over a dispensing opening in a bottom surface of the housing;

dropping, by gravitational force, the small piece good through the dispensing opening; and reducing, by only three contact reducing members disposed on the planar surface of a left radial wall of the lower section of the first channel, a contact area between the small piece good and the first left radial wall of the lower section of the first channel, wherein the planar surface of the left radial wall of the lower section of the first channel is linearly smooth other than where the three contact reducing members are disposed.

12. The method of claim 11, further comprising reducing an electrostatic attraction between the small piece good and the left radial wall.

13. The method of claim 11, wherein each contact reducing member comprises a depression, the method comprising:

reducing, via the depression, the contact area between the small piece good and the first channel.

14. The method of claim 11, wherein each contact reducing member comprises a vertical groove, the method comprising:

reducing, via the vertical groove, the contact area between the small piece good and the first channel.

15. The method of claim 11, wherein each contact reducing member comprises an elevation, the method comprising:

reducing, via the elevation, the contact area between the small piece good and the first channel.

16. The method of claim 11, wherein the plurality of channels is defined by a plurality of webs disposed on a base body of the separating device and comprising a horizontal slot dividing each of the plurality of webs into an upper web section and a lower web section, and dividing each of the plurality of channels into an upper channel section and a lower channel section, the method comprising:

reducing, via the contact reducing members disposed on a radial wall of the lower channel section of the first channel, the contact area between the small piece good and the lower channel section of the first channel.

17. The method of claim 16, wherein a retaining section of a retainer is disposed in the horizontal slot, the method comprising:

preventing, by the retaining section, another small piece good in the first channel aligned with the dispensing opening from falling from the upper channel section of the first channel into the lower channel section of the first channel.

18. The method of claim 11, wherein the plurality of channels is defined by a plurality of webs disposed on a base body of the separating device and comprising a horizontal slot dividing each of the plurality of webs into an upper web section and a lower web section, and dividing each of the plurality of channels into an upper channel section and a lower channel section, the method comprising:

reducing, via the contact reducing members disposed on a radial wall of the upper channel section of the first channel, the contact area between the small piece good and the upper channel section of the first channel.

19. The method of claim 18, wherein a retaining section of a retainer is disposed in the horizontal slot, the method comprising:

preventing, by the retaining section, another small piece good in the first channel aligned with the dispensing opening from falling from the upper channel section of the first channel into the lower channel section of the first channel.

20. The method of claim 11, wherein a plurality of horizontal radial grooves are arranged on a bottom surface of the separating device and are open towards an outer periphery of the separating device, the method comprising:

preventing, via the plurality of horizontal radial grooves, the small piece good from adhering to a base area on a bottom surface of the separating device.

* * * * *

UNITED STATES PATENT AND TRADEMARK OFFICE
CERTIFICATE OF CORRECTION

PATENT NO. : 12,521,313 B2  
APPLICATION NO. : 18/234637  
DATED : January 13, 2026  
INVENTOR(S) : Thomas Risch Page 1 of 1

It is certified that error appears in the above-identified patent and that said Letters Patent is hereby corrected as shown below:

In the Claims

Claim 11
In Column 11, Line 27, delete "first"

Signed and Sealed this
Tenth Day of February, 2026

John A. Squires
*Director of the United States Patent and Trademark Office*